(12) United States Patent
Saddoughi et al.

(10) Patent No.: US 6,629,674 B1
(45) Date of Patent: Oct. 7, 2003

(54) METHOD AND APPARATUS FOR MODULATING AIRFOIL LIFT

(75) Inventors: Seyed Gholamali Saddoughi, Clifton Park, NY (US); Ivett Alejandra Leyva, Niskayuna, NY (US); Anthony John Dean, Scotia, NY (US); Bernard Francois Robic, Niskayuna, NY (US); Lawrence Butler, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 47 days.

(21) Appl. No.: 10/202,533

(22) Filed: Jul. 24, 2002

(51) Int. Cl.[7] ................................................ B64C 21/04
(52) U.S. Cl. .................... 244/207; 244/204; 416/231 R
(58) Field of Search ............................... 244/207, 204, 244/201; 416/20 R, 223 R, 231 R

(56) References Cited

U.S. PATENT DOCUMENTS

| | | | | |
|---|---|---|---|---|
| 3,936,013 A | * | 2/1976 | Yuan ........................... | 244/199 |
| 4,555,079 A | * | 11/1985 | Harvell et al. ............... | 244/207 |
| 5,114,102 A | * | 5/1992 | Wang ........................... | 244/207 |

OTHER PUBLICATIONS

R. Funk, et al "Transient Separation Control Using Pulse Combustion Actuation", American Institute of Aeronautics and Astronautics, 1st Flow Conference, St. Louis, MO, Jun. 2002, pp. 1–9.

US patent application entitled "Method and Apparatus for Modulating Flow Separtion" By S. Saddoughi, Attorney Docket No. 126892.

* cited by examiner

*Primary Examiner*—J. Woodrow Eldred
(74) *Attorney, Agent, or Firm*—Penny A. Clarke; Patrick K. Patnode

(57) ABSTRACT

An apparatus comprising: an airfoil adapted for generating a lift force; and a first pulse detonation actuator disposed inside the airfoil and adapted for impulsively detonating a fuel/air mixture to produce a pressure rise and velocity increase of combustion products therein, the airfoil having a plurality of lift control holes adapted for communicating combustion product flows from the first pulse detonation actuator to an airfoil surface to modulate the lift force.

26 Claims, 1 Drawing Sheet

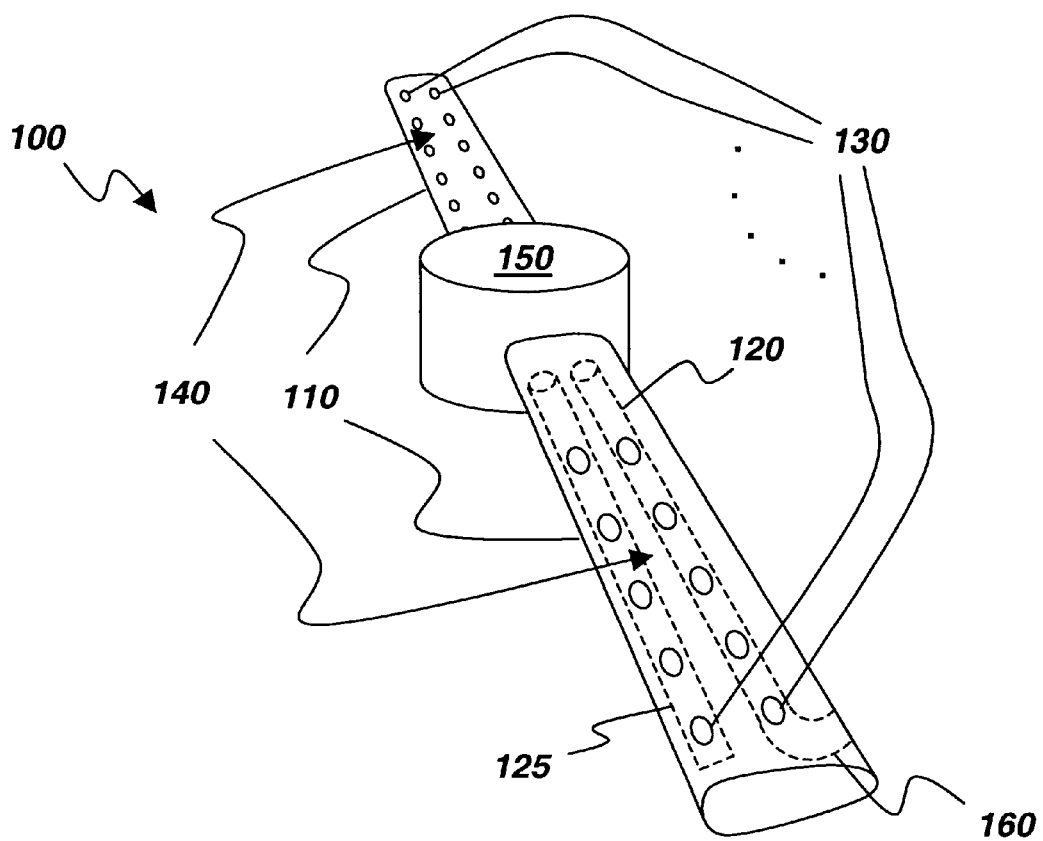

METHOD AND APPARATUS FOR MODULATING AIRFOIL LIFT

BACKGROUND

The present invention relates generally to the field of modulating airfoil lift and more specifically to the use of a pulse detonation actuator (PDA) for injecting fluid into an airfoil boundary layer.

In a wide variety of applications, airfoils are used to create a pressure rise in an ambient fluid flowing over the airfoil. The pressure rise acting over the airfoil surface produces a "lift force" or, simply, "lift." Examples of airfoils include, but are not limited to, aircraft wings; rotor blades for propellers, fans, compressors, turbines, helicopters, and other rotorcraft; and stator vanes for compressors and turbines.

In operation, an airfoil creates a pressure rise from a suction surface on one side of the airfoil to a pressure surface on an opposite side by imposing on the fluid flow a greater curvature on the suction surface than on the pressure surface. A reduction of the efficacy of the airfoil results, however, when the fluid flow boundary layer separates from the suction surface.

One strategy for reducing the tendency toward boundary layer separation is to inject fluid into the boundary layer through jets in the suction surface. Typically, the effectiveness of this strategy increases as the velocity of the injected fluid approaches the velocity of the bulk fluid flow. Conversely, applicability of the strategy is conventionally limited by the pressure rise and velocity increase for fluid injection producible by conventional means.

A pulse detonation actuator (PDA) provides a means for creating a pressure rise and velocity increase greater, in some applications, than the pressure rise and velocity increase available for boundary layer fluid injection by conventional means. Opportunities exist, therefore, to broaden the applicability of boundary layer fluid injection through the use of PDAs.

SUMMARY

The opportunities described above are addressed, in one embodiment of the present invention, by an apparatus comprising: an airfoil adapted for generating a lift force; and a first pulse detonation actuator disposed inside the airfoil and adapted for impulsively detonating a fuel/air mixture to produce a pressure rise and velocity increase of combustion products therein, the airfoil having a plurality of lift control holes adapted for communicating combustion product flows from the first pulse detonation actuator to an airfoil surface to modulate the lift force.

DRAWINGS

These and other features, aspects, and advantages of the present invention will become better understood when the following detailed description is read with reference to the accompanying drawings in which like characters represent like parts throughout the drawings, wherein:

The FIGURE illustrates a perspective drawing of an apparatus in accordance with one embodiment of the present invention.

DETAILED DESCRIPTION

In accordance with one embodiment of the present invention, the FIGURE illustrates a perspective drawing of an apparatus 100 comprising an airfoil 110, a first pulse detonation actuator 120, and a hub 150. In operation, airfoil 110 generates a lift force due to fluid flow over an airfoil surface 140; first pulse detonation actuator 120 is disposed inside airfoil 110 and impulsively detonates a fuel/air mixture to produce a pressure rise and velocity increase of combustion products inside first pulse detonation actuator 120; hub 150 is mechanically coupled to airfoil 110 and transmits force between an external shaft (not shown) and airfoil 110. To modulate the lift force, airfoil 110 has a plurality of lift control holes 130 for communicating combustion product flows from first pulse detonation actuator 120 to airfoil surface 140. To impart a thrust force to airfoil 110 and thus a torque about an axis of hub 150, first pulse detonation actuator 120 comprises an exit nozzle 160 for directing the combustion products overboard. Apparatus 100 is thus a self-propelled rotor useful, by way of example, not limitation, as a helicopter rotor. In some embodiments, exit nozzle 160 is absent so that apparatus 100 is a passive rotor useful, by way of example, not limitation, in a turbine or compressor of a gas turbine engine. In other embodiments, hub 150 is absent so that apparatus 100 is an airfoil surface useful, by way of example, not limitation, as an aircraft wing or as a vane in a turbine or compressor of a gas turbine engine.

As used herein, a "pulse detonation actuator" is understood to mean any device or system which produces both a pressure rise and velocity increase from a series of repeating detonations or quasi-detonations within the device. A "quasi-detonation" is a combustion process which produces a pressure rise and velocity increase higher than the pressure rise and velocity increase produced by a deflagration wave. Typical embodiments of PDAs comprise a means of igniting a fuel/air mixture, and a detonation chamber in which pressure wave fronts initiated by the ignition process coalesce to produce a detonation wave. The geometry of the detonation chamber is such that the pressure rise of the detonation wave expels combustion products out the PDA exhaust. As used herein, "impulsively detonating" refers to a process of repeating detonations or quasi-detonations wherein each detonation or quasi-detonation is initiated either by external ignition (for example, without limitation, spark discharge or laser pulse) or by gas dynamic processes (for example, without limitation, shock initiation or autoignition).

In a more detailed embodiment in accordance with the embodiment of the FIGURE, lift control holes 130 are shaped to promote attachment of the boundary layer to airfoil surface 140 so that the lift force is an increasing function of the combustion product flows. In an alternative embodiment, lift control holes 130 are shaped to promote separation of the boundary layer from airfoil surface 140 so that the lift force is a decreasing function of the combustion product flows.

In another more detailed embodiment in accordance with the embodiment of the FIGURE, apparatus 100 further comprises a second PDA 125 disposed inside airfoil 110 with a portion of lift control holes 130 communicating combustion product flows from second PDA 125 to airfoil surface 140 to modulate the lift force. In some embodiments, combustion product flows from second PDA 125 serve to increase the lift force; in alternative embodiments, combustion product flows from second PDA 125 serve to decrease the lift force. For some applications, having both lift increasing and lift decreasing PDAs extends the range of lift forces producible by apparatus 100.

In another more detailed embodiment in accordance with the embodiment of the FIGURE, second PDA 125 operates out of phase with first PDA 120. Out of phase operation raises the frequency with which combustion product pulses are delivered to the boundary layer and, in some applications, produces a temporally more uniform boundary layer compared to operation with a single PDA.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus comprising:

an airfoil adapted for generating a lift force; and a first pulse detonation actuator disposed inside said airfoil and adapted for impulsively detonating a fuel/air mixture to produce a pressure rise and velocity, increase of combustion products therein, said airfoil having a plurality of lift control holes adapted for communicating combustion product flows from said first pulse detonation actuator to an airfoil surface to modulate said lift force.

2. The apparatus of claim 1 wherein said lift control holes are shaped so that said lift force is an increasing function of said combustion product flows.

3. The apparatus of claim 1 wherein said lift control holes are shaped so that said lift force is a decreasing function of said combustion product flows.

4. The apparatus of claim 1 wherein said first pulse detonation actuator comprises an exit nozzle disposed and adapted for directing said combustion products to impart a thrust force to said airfoil.

5. The apparatus of claim 1 further comprising a second pulse detonation actuator disposed inside said airfoil, said lift control holes being further adapted for communicating combustion product flows from said second pulse detonation actuator to said airfoil surface to modulate said lift force.

6. The apparatus of claim 5 wherein said second pulse detonation actuator is adapted for operating out of phase with said first pulse detonation actuator.

7. The apparatus of claim 5 wherein a first subset of said lift control holes is adapted for communicating with said first pulse detonation actuator and shaped so that said lift force is an increasing function of said combustion product flows, a second subset of said lift control holes is adapted for communicating with said second pulse detonation actuator and shaped so that said lift force is a decreasing function of said combustion product flows.

8. An apparatus comprising:

an airfoil adapted for generating a lift force;

a first pulse detonation actuator disposed inside said airfoil and adapted for impulsively detonating a fuel/air mixture to produce a pressure rise and velocity increase of combustion products therein; and a hub mechanically coupled to said airfoil and adapted for transmitting force between an external shaft and said airfoil, said airfoil having a plurality of lift control holes adapted for communicating combustion product flows from said first pulse detonation actuator to an airfoil surface to modulate said lift force, said first pulse detonation actuator comprising an exit nozzle disposed and adapted for directing said combustion products to impart a thrust force to said airfoil.

9. The apparatus of claim 8 wherein said lift control holes are shaped so that said lift force is an increasing function of said combustion product flows.

10. The apparatus of claim 8 wherein said lift control holes are shaped so that said lift force is a decreasing function of said combustion product flows.

11. The apparatus of claim 8 further comprising a second pulse detonation actuator disposed inside said airfoil, said lift control holes being further adapted for communicating combustion product flows from said second pulse detonation actuator to said airfoil surface to modulate said lift force.

12. The apparatus of claim 11 wherein said second pulse detonation actuators adapted for operating out of phase with said first pulse detonation actuator.

13. The apparatus of claim 11 wherein a first subset of said lift control holes is adapted for communicating with said first pulse detonation actuator and shaped so that said lift force is an increasing function of said combustion product flows, a second subset of said lift control holes is adapted for communicating with said second pulse detonation actuator and shaped so that said lift force is a decreasing function of said combustion product flows.

14. A method comprising:

generating a lift force using an airfoil;

impulsively detonating a first fuel/air mixture to produce a pressure rise and velocity increase of first combustion products inside said airfoil; and communicating a plurality of first combustion product flows to an airfoil surface to modulate said lift force.

15. The method of claim 14 wherein said lift force is an increasing function of said first combustion product flows.

16. The method of claim 14 wherein said lift force is a decreasing function of said first combustion product flows.

17. The method of claim 14 further comprising directing said combustion products to impart a thrust force to said airfoil.

18. The method of claim 14 further comprising:

impulsively detonating a second fuel/air mixture to produce a pressure rise and velocity increase of second combustion products inside said airfoil; and communicating a plurality of second combustion product flows to said airfoil surface to modulate said lift force.

19. The method of claim 18 wherein impulsively detonating said first fuel/air mixture occurs out of phase with impulsively detonating said second fuel/air mixture.

20. The method of claim 18 wherein:

said lift force is an increasing function of said first combustion product flows, said lift force is a decreasing function of said second combustion product flows.

21. A method comprising:

generating a lift force using an airfoil;

transmitting force between an external shaft and said airfoil;

impulsively detonating a first fuel/air mixture to produce a pressure rise and velocity increase of first combustion products inside said airfoil;

communicating a plurality of first combustion product flows to an airfoil surface to modulate said lift force; and directing said combustion products to impart a thrust force to said airfoil.

22. The method of claim 21 wherein said lift force is an increasing function of said first combustion product flows.

23. The method of claim 21 wherein said lift force is a decreasing function of said first combustion product flows.

24. The method of claim 21 further comprising:
impulsively detonating a second fuel/air mixture to produce a pressure rise and velocity increase of second combustion products inside said airfoil; and
communicating a plurality of second combustion product flows to said airfoil surface to modulate said lift force.

25. The method of claim 24 wherein impulsively detonating said first fuel/air mixture occurs out of phase with impulsively detonating said second fuel/air mixture.

26. The method of claim 24 wherein:
said lift force is an increasing function of said first combustion product flows,
said lift force is a decreasing function of said second combustion product flows.

* * * * *